United States Patent
Johari-Galle

(12) 
(10) Patent No.: US 9,091,544 B2
(45) Date of Patent: Jul. 28, 2015

(54) XY-AXIS SHELL-TYPE GYROSCOPES WITH REDUCED CROSS-TALK SENSITIVITY AND/OR MODE MATCHING

(75) Inventor: Houri Johari-Galle, Sunnyvale, CA (US)

(73) Assignee: Analog Devices, Inc., Norwood, MA (US)

( * ) Notice: Subject to any disclaimer, the term of this patent is extended or adjusted under 35 U.S.C. 154(b) by 298 days.

(21) Appl. No.: 13/482,186

(22) Filed: May 29, 2012

(65) Prior Publication Data

US 2013/0319116 A1   Dec. 5, 2013

(51) Int. Cl.
| G01C 19/56 | (2012.01) |
| G01C 19/5684 | (2012.01) |
| G01C 19/5698 | (2012.01) |

(52) U.S. Cl.
CPC ........ *G01C 19/5684* (2013.01); *G01C 19/5698* (2013.01)

(58) Field of Classification Search
USPC ................ 73/504.13, 504.12, 504.02, 504.04
See application file for complete search history.

(56) References Cited

U.S. PATENT DOCUMENTS

| 3,307,409 | A |   | 3/1967 | Newton, Jr. .................... 73/505 |
| 4,384,409 | A |   | 5/1983 | Lao ................................ 33/318 |
| 4,655,081 | A |   | 4/1987 | Burdess ......................... 73/505 |
| 4,809,589 | A |   | 3/1989 | Bertrand ...................... 92/98 R |
| 5,177,579 | A |   | 1/1993 | Jerman .......................... 73/724 |
| 5,383,362 | A |   | 1/1995 | Putty et al. ..................... 73/505 |
| 5,450,751 | A |   | 9/1995 | Putty et al. ................. 73/504.18 |
| 5,589,082 | A |   | 12/1996 | Lin et al. ........................... 216/2 |
| 5,616,864 | A |   | 4/1997 | Johnson et al. ............ 73/504.04 |
| 5,750,899 | A |   | 5/1998 | Hegner et al. .................... 73/756 |
| 5,767,405 | A |   | 6/1998 | Bernstein et al. .......... 73/504.16 |
| 5,783,749 | A |   | 7/1998 | Lee et al. ................... 73/504.12 |
| 5,915,276 | A | * | 6/1999 | Fell ............................. 73/504.13 |
| 5,937,275 | A |   | 8/1999 | Munzel et al. ................... 438/50 |
| 5,992,233 | A |   | 11/1999 | Clark ......................... 73/514.35 |
| 6,151,964 | A |   | 11/2000 | Nakajima .................. 73/504.13 |
| 6,209,393 | B1 |  | 4/2001 | Tomikawa et al. ......... 73/504.12 |
| 6,240,781 | B1 |  | 6/2001 | Namerikawa et al. ..... 73/504.13 |
| 6,343,509 | B1 | * | 2/2002 | Fell et al. ................... 73/504.13 |

(Continued)

FOREIGN PATENT DOCUMENTS

| EP | 0860685 | 8/1998 | ............. G01C 19/56 |
| EP | 1788385 | 5/2007 | ............. G01N 29/02 |

(Continued)

OTHER PUBLICATIONS

Apostolyuk et al., "Dynamics of Micromechanical Coriolis Vibratory Gyroscopes," Sensor Letters. vol. 2, 1-8, 2005.

(Continued)

*Primary Examiner* — Helen Kwok
(74) *Attorney, Agent, or Firm* — Sunstein Kann Murphy & Timbers LLP

(57) ABSTRACT

Cross-talk sensitivity in an xy-axis shell-type gyroscope can be rejected or reduced by operating the gyroscope with a single in-plane flexural or bulk resonance mode and sensing two out-of-plane degenerate or non-degenerate resonance modes resulting from rotations about two axes in the plane of the resonator. Mode matching in an xy-axis shell-type gyroscope can be achieved by configuring the resonator (e.g., size, shape, thickness) to match the in-plane and out-of-plane resonance frequencies for the drive and sense modes of interest.

22 Claims, 9 Drawing Sheets

(56) References Cited

U.S. PATENT DOCUMENTS

| | | | |
|---|---|---|---|
| 6,401,534 B1* | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 | 10/2005 | Nguyen et al. | 310/321 |
| 6,978,674 B2* | 12/2005 | Fell et al. | 73/504.13 |
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.04 |
| 7,051,590 B1 | 5/2006 | Lemkin et al. | 73/504.04 |
| 7,089,792 B2 | 8/2006 | Geen | 73/504.14 |
| 7,123,111 B2* | 10/2006 | Brunson et al. | 331/116 M |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,357,025 B2 | 4/2008 | Geen | 73/504.12 |
| 7,360,423 B2 | 4/2008 | Ayazi et al. | 73/504.12 |
| 7,420,318 B1 | 9/2008 | Pulskamp | 310/328 |
| 7,427,819 B2 | 9/2008 | Hoen et al. | 310/320 |
| 7,492,241 B2 | 2/2009 | Piazza et al. | 333/189 |
| 7,543,496 B2 | 6/2009 | Ayazi et al. | 73/504.12 |
| 7,551,043 B2 | 6/2009 | Nguyen et al. | 333/186 |
| 7,581,443 B2 | 9/2009 | Kubena et al. | 73/504.12 |
| 7,637,156 B2 | 12/2009 | Araki et al. | 73/504.13 |
| 7,874,209 B2 | 1/2011 | Stewart | 73/504.01 |
| 7,895,892 B2 | 3/2011 | Aigner | 73/504.01 |
| 8,056,413 B2 | 11/2011 | Yazdi | 73/504.13 |
| 8,166,816 B2 | 5/2012 | Ayazi et al. | 73/504.12 |
| 8,250,919 B2* | 8/2012 | Ofri et al. | 73/504.13 |
| 8,408,060 B2* | 4/2013 | Kuang et al. | 73/504.13 |
| 8,616,056 B2* | 12/2013 | Sammoura et al. | 73/504.13 |
| 8,631,700 B2* | 1/2014 | Sammoura et al. | 73/504.12 |
| 2003/0119220 A1 | 6/2003 | Mlcak et al. | 438/52 |
| 2003/0183888 A1 | 10/2003 | Bar-Sadeh et al. | 257/419 |
| 2004/0050160 A1* | 3/2004 | Bae et al. | 73/504.13 |
| 2004/0051595 A1 | 3/2004 | Yoshimine et al. | 331/158 |
| 2004/0085000 A1 | 5/2004 | Ogiura | 310/329 |
| 2004/0134279 A1* | 7/2004 | Fell et al. | 73/504.13 |
| 2005/0072230 A1 | 4/2005 | Koike et al. | 73/504.12 |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/338 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1 | 3/2008 | Ayazi et al. | 310/309 |
| 2008/0180890 A1 | 7/2008 | Bolis | 361/290 |
| 2008/0190181 A1 | 8/2008 | Khuri-Yakub et al. | 73/64.53 |
| 2008/0282833 A1 | 11/2008 | Chaumet | 74/5 R |
| 2009/0095079 A1 | 4/2009 | Ayazi | 73/514.29 |
| 2009/0114016 A1 | 5/2009 | Nasiri et al. | 73/504.12 |
| 2009/0133498 A1* | 5/2009 | Lo et al. | 73/504.13 |
| 2009/0173157 A1 | 7/2009 | Stewart | 73/504.13 |
| 2009/0173158 A1 | 7/2009 | Gehring | 73/590 |
| 2009/0188317 A1 | 7/2009 | Aigner | 73/504.01 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0148341 A1 | 6/2010 | Fuji et al. | 257/686 |
| 2010/0218606 A1* | 9/2010 | Fell | 73/504.13 |
| 2010/0263445 A1 | 10/2010 | Hayner et al. | 73/504.12 |
| 2010/0294039 A1 | 11/2010 | Geen | 73/504.12 |
| 2011/0023601 A1* | 2/2011 | Ikeda et al. | 73/504.13 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1* | 6/2012 | Judy et al. | 73/504.12 |
| 2012/0137774 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |
| 2013/0283911 A1 | 10/2013 | Ayazi et al. | 73/504.12 |

FOREIGN PATENT DOCUMENTS

| | | | | |
|---|---|---|---|---|
| EP | 2 078 925 | | 7/2009 | G01C 19/56 |
| EP | 2216904 | | 8/2010 | H03H 9/25 |
| JP | 9116250 | | 5/1997 | H05K 1/18 |
| JP | 2004 301734 | | 10/2004 | G01C 19/56 |
| WO | WO 99/47891 | | 9/1999 | G01C 19/56 |
| WO | WO 03/025504 | | 3/2003 | G01C 19/56 |
| WO | WO 2007/061610 | | 5/2007 | H01L 41/08 |
| WO | WO 2009/066640 | | 5/2009 | H03H 9/25 |

OTHER PUBLICATIONS

Ayazi, "Integrated Solutions for Motion Sensing in Handheld Devices," Qualtré, http://www.qualtre.com/motion-sensing-technology/, 3 pages, Oct. 2010.

Ayazi et al., "High Aspect-Ratio Combined Poly and Single-Crystal Silicon (HARPSS) MEMS Technology," Journal of Microelectromechanical Systems, vol. 9, No. 3, pp. 288-294, Sep. 2000.

Ayazi et al., "Design and Fabrication of a High-Performance Polysilicon Vibrating Ring Gyroscope," Eleventh IEEE/ASME International Workshop on Micro Electro Mechanical Systems, Heidelberg, Germany, 6 pages, Jan. 25-29, 1998.

Ayazi et al., "A HARPSS Polysilicon Vibrating Ring Gyroscope;" Journal of Microelectromechanical Systems, vol. 10, No. 2, pp. 169-179, Jun. 2001.

Benes et al., "Comparison Between BAW and SAW Sensor Principles," IEEE Transactions on Ultrasonics, Ferroelectrics and Frequency Control, vol. 45 No. 5, pp. 1314-1330, Sep. 1998.

Bernstein, "An Overview of MEMS Inertial Sensing Technology," Sensors, http://www.sensorsmag.com/sensors/acceleration-vibration/an-overview-mems-inertial-sensing-technology-970, 6 pages, Feb. 1, 2003.

Celikel et al., "Optoelectronic Design Parameters of Interferometric Fiber Optic Gyroscope with LiNbO$_3$ having North Finder Capability and Earth Rotation Rate Measurement," Indian Journal of Pure & Applied Physics, vol. 48, pp. 375-384, Jun. 2010.

Doe, "Qualtré Targets 3-Axis Gyro Market with Alternative Technology," MEMS Trends, Issue No. 3, 1 page, Jul. 2010.

Drafts, "Acoustic Wave Technology Sensors," Sensors (www.sensorsmag.com), 5 pages, Oct. 1, 2000.

Dubois, "Thin film bulk acoustic wave resonators: a technology overview," MEMSWAVE 03, Toulouse, France, 4 pages, Jul. 2-4, 2003.

Geen et al., New iMEMS® Angular-Rate-Sensing Gyroscope, ADI Micromachined Products Division, Analog Dialogue 37-03, 4 pages, 2003.

Jiang et al., "A Monolithic Surface Micromachined Z-Axis Gyroscope with Digital Output," *Symposium on VLSI Circuits*, 4 pages, Jun. 2000.

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, 28 pages, Dec. 2008.

Johari et al., "High-Frequency Capacitive Disk Gyroscope in (100) and (111) Silicon," IEEE, MEMS 2007, Kobe, Japan, pp. 47-50, Jan. 21-25, 2007.

Johari et al., "Capacitive Bulk Wave Silicon Disk Gyroscopes," Electron Devices Meeting, 2006, 4 pages, Dec. 1, 2006.

Johnson, "Qualtre Preps Solid State MEMS Gyros," *MEMS Investor Journal*, http://www.memsinvestorjournal.com/2010/04/qualtre-preps-solidstate-mems-gyros.html_, 2 pages, Apr. 8, 2010.

Link, "Angular Rate Detector DAVED®-RR," Application Report SE 090.2; Institute of Micromachining and Information Technology,

(56) References Cited

OTHER PUBLICATIONS http://hsgimit.de/fileadmin/gfx/pdfs/AnwendungsberichtSE090__2rr_englisch_V1.pdf, 1 page, Dec. 11, 2007.

Link, "Angular Rate Detector DAVED®-LL," Application Report SE 100.1; Institute of Micromachining and Information Technology, hsg-imit.de/fileadmin/gfx/pdfs/anwendungsberichtse100_111_englisch01.pdf, 1 page, Dec. 11, 2007.

Nasiri, "A Critical Review of MEMS Gyroscopes Technology and Commercialization Status," InvenSense, www.scantec.de/uploads/media/MEMSGyroComp_02.pdf, 8 pages, 2005.

Ramirez, "PZE Energy Harvester," 45 RF MEMS Based Circuit Design—conocimeintos.com.ve, http://conocimientosrfmemsdesign.blogspot.com/2010/07/pze-energy-harvester.html, 4 pages, Jul. 24, 2010.

Satrom et al., "Disc Resonating Gyroscopes: A Summary of a Recent Development in MEMS Technology," Northwestern University, http://www.google.com/url?sa=t&rct=j&q=&esrc=s&frm=1&source=web&cd=1&sqi=2&ved=0CCQQFjAA&url=http%3A%2F%2Fclifton.mech.northwestern.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi81zMw, 15 pages, Dec. 1, 2006.

Saukoski, "System and Circuit Design for a Capacitive MEMS Gyroscope," Doctoral Dissertation, TKK Dissertations 116, Helsinki University of Technology, 279 pages, 2008.

Shkel et al., "Two Types of Micromachined Vibratory Gyroscopes," IEEE, pp. 531-526, 2005.

Tatar, "Quadrature Error Compensation and its Effects on the Performance of Fully Decoupled MEMS Gyroscopes," A Thesis Submitted to the Graduate School of Natural and Applied Sciences of Middle East Technical University, 169 pages, Sep. 2010.

Weinberg et al., "Error Sources in In-Plane Silicon Tuning-Fork MEMS Gyroscopes," *The Draper Technology Digest, Draper Laboratory*, vol. 11, 2007.

Xie et al., "Fabrication, Characterization, and Analysis of the DRIE CMOS-MEMO Gyroscope," IEEE Sensors Journal, vol. 3, No. 5, pp. 622-631, Oct. 2003.

Yang et al., "An electro-thermal bimorph-based microactuator for precise track-positioning of optical disk drives;" Journal of Micromechanics and Microengineering, vol. 15, pp. 958-965, 2005.

International Searching Authority, International Search Report—International Application No. PCT/US2013/042818, dated Sep. 5, 2013, together with the Written Opinion of the International Searching Authority, 9 pages.

* cited by examiner

XY-AXIS SHELL-TYPE GYROSCOPES WITH REDUCED CROSS-TALK SENSITIVITY AND/OR MODE MATCHING

CROSS-REFERENCE TO RELATED APPLICATION(S)

This patent application may be related to one or more of the following commonly-owned patent applications, each of which is hereby incorporated herein by reference in its entirety:

U.S. patent application Ser. No. 12/940,354 filed Nov. 5, 2010;

U.S. patent application Ser. No. 12/983,476 filed Jan. 3, 2011;

U.S. patent application Ser. No. 13/308,687 filed Dec. 1, 2011; and

U.S. patent application Ser. No. 13/309,511 filed Dec. 1, 2011.

FIELD OF THE INVENTION

The present invention relates generally to reducing cross-talk sensitivity and/or to mode matching in XY-axis shell-type gyroscopes.

BACKGROUND OF THE INVENTION

In any dual xy-axis rotation rate gyroscope, it is desirable to minimize the cross-talk sensitivity between the two sensitive axes. This implies that, for example, for xy-axis rotation-rate gyroscopes, the sensitivity to x-axis rate should be decoupled from the sensitivity to y-axis rate when both x-axis and y-axis rates are applied to the gyroscope simultaneously. This can be achieved either by isolating the two sense modes mechanically or employing some compensation method with electronics. The former method will increase the form factor of the device and the latter makes the circuit very complex. This problem is more challenging for xy-axis gyroscopes in comparison with xz-axis or yz-axis gyros since in the xy-axis gyroscope, both sensitive axes are in-plane.

One technique for reducing cross-talk sensitivity in xy-axis shell-type gyroscopes is to drive the shell-type gyroscope in an out-of-plane mode and sense the Coriolis forces using two in-plane modes. Here, the drive forces are perpendicular to the plane of the gyroscope, which produces velocities along the z-axis. Due to the application of simultaneous in-plane rotation rates around x-axis and y-axis, the device will be sensitive to both rates, and Coriolis forces will be created along both the y-axis and the x-axis at any single point, respectively. To reduce this cross-talk sensitivity between the two modes, mode rejection and calibration methods are typically implemented. In addition, a set of electrodes is typically dedicated to distinguish sensing x-axis rotation rates from y-axis rates, which consumes more space and results in more complicated MEMS structure and routings as well as associated circuitry.

SUMMARY OF EXEMPLARY EMBODIMENTS

In certain exemplary embodiments, a shell-type gyroscope with improved cross-talk sensitivity includes a resonator substantially disposed in a resonator plane, a plurality of drive electrodes disposed substantially in the resonator plane, and a plurality of sense electrodes disposed parallel to the resonator plane, wherein the resonator is driven via the drive electrodes in an in-plane flexural or bulk resonance mode substantially in the resonator plane, and wherein rotations about two orthogonal axes in the resonator plane are sensed via the sense electrodes using two out-of-plane flexural or bulk modes of the resonator caused by rotation about the axes, the in-plane drive mode substantially rejecting cross-talk between the two orthogonal sense axes.

Exemplary embodiments also include a method for operating a shell-type gyroscope having a resonator substantially disposed in a resonator plane, a plurality of drive electrodes disposed substantially in the resonator plane, and a plurality of sense electrodes disposed parallel to the resonator plane. The method includes driving, via the drive electrodes, resonance of the resonator in an in-plane flexural or bulk resonance mode substantially in the resonator plane; and sensing, via the sense electrodes, rotations about two orthogonal axes in the resonator plane using two out-of-plane flexural or bulk modes of the resonator caused by rotation about the axes, the in-plane drive mode substantially rejecting cross-talk between the two orthogonal sense axes.

Exemplary embodiments also include apparatus for operating a shell-type gyroscope having a resonator substantially disposed in a resonator plane, a plurality of drive electrodes disposed substantially in the resonator plane, and a plurality of sense electrodes disposed parallel to the resonator plane. The apparatus includes a drive circuit configured to drive, via the drive electrodes, resonance of the resonator in an in-plane flexural or bulk resonance mode substantially in the resonator plane; and a sense circuit configured to sense, via the sense electrodes, rotations about two orthogonal axes in the resonator plane using two out-of-plane flexural or bulk modes of the resonator caused by rotation about the axes, the in-plane drive mode substantially rejecting cross-talk between the two orthogonal sense axes.

In various alternative embodiments, the out-of plane modes may be degenerate modes or may be non-degenerate modes. The axes may include orthogonal x and y axes with the drive and sense electrodes aligned with the x and y axes and the in-plane mode an elliptical mode having anti-nodes substantially along the x and y axes, in which case the sense electrodes that are parallel to the resonator plane and aligned with the x axis may be configured for sensing rotation rate about the y axis and the sense electrodes that are parallel to the resonator plane and aligned with the y axis may be configured for sensing rotation rate about the x axis. A sense circuit for such an embodiment may include a first circuit configured to receive signals from the sense electrodes aligned with the y-axis indicative of a first resonant sense mode in the z-direction caused by rotation rate about the x-axis and output a signal indicative of rotation rate about the x-axis based on the signals from the sense electrodes in the z-direction and aligned with the y-axis and a velocity signal indicative of velocity of the resonator along the y-axis; and a second circuit configured to receive signals from the sense electrodes aligned with the x-axis indicative of a second resonant sense mode in the z-direction caused by rotation rate about the y-axis and output a signal indicative of rotation rate about the y-axis based on the signals from the sense electrodes in the z-direction and aligned with the x-axis and a velocity signal indicative of velocity of the resonator along the x-axis. The resonator may be configured such that the frequency of the in-plane mode substantially matches the frequency of the out-of-plane mode; for example, at least one of the size, shape, or thickness of the resonator may be specially configured to substantially match the frequencies.

In further exemplary embodiments, the gyroscope may further include a second plurality of sense electrodes disposed substantially in the resonator plane, wherein rotations about a z-axis normal to the resonator plane are sensed via the second plurality of sense electrodes. For example, the inplane mode may be an elliptical mode having anti-nodes substantially along x and y axes, and the second plurality of sense electrodes may be located substantially at the anti-nodes of an elliptical mode having anti-nodes along axes offset substantially 45 degrees from the x and y axes.

Exemplary embodiments also may include a method for reducing cross-talk sensitivity in an xy-axis shell-type gyroscope, the method including operating the gyroscope with a single in-plane flexural or bulk resonance mode and sensing two out-of-plane degenerate or non-degenerate resonance modes resulting respectively from rotations about two axes in the plane of the resonator.

Exemplary embodiments also may include an xy-axis shell-type gyroscope comprising a resonator substantially disposed in a resonator plane, at least one drive electrode for driving a resonator drive mode, and at least one sense electrode for sensing a resonator sense mode, wherein one of modes is an in-plane mode and the other is an out-of-plane mode, and wherein the resonator is specially configured to substantially match the resonance frequencies of the modes.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
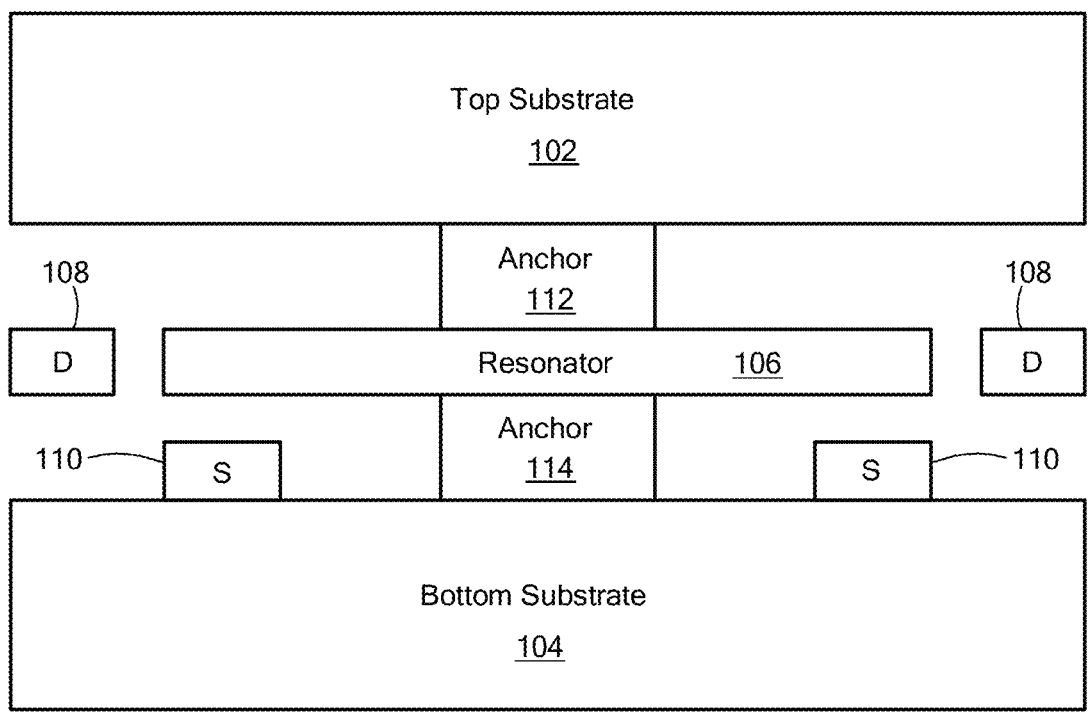
FIG. 1 is a schematic diagram of a shell-type gyroscope in accordance with an exemplary embodiment.

Definitions. As used in this description and the accompanying claims, the following terms shall have the meanings indicated, unless the context otherwise requires:

A "set" includes one or more elements.

An "electrode" is a structure through which an electrical or electromechanical effect is applied and/or sensed. In exemplary embodiments, various electrodes are used for applying and/or sensing electrical or electromechanical effects through capacitive coupling, although it should be noted that other types of electrodes and couplings may be used (e.g., piezoelectric).

The term "quality factor" or "Q-factor" or simply "Q" denotes a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. A system with a high Q resonates with a greater amplitude (at the resonant frequency) than one with a low Q factor, and its response falls off more rapidly as the frequency moves away from resonance.

The "mode" of a resonating body is the shape of motion of the body at resonance. Modes that have identical resonant frequencies are referred to as being "degenerate" or "degenerative" modes because oscillations in these modes cannot be distinguished from each other according to frequency. On the other hand, modes that have non-identical resonant frequencies are referred to as being "non-degenerate" or "non-degenerative." Embodiments are presented for cross-talk sensitivity reduction and/or mode-matching (or near mode-matching) in xy-axis shell-type gyroscopes.

The term "shell-type gyroscope" is a non-specific term referring to a gyroscope that is shaped like a shell, for example, having a resonant mass shaped as a disk, ring, donut, cylinder, hemi-sphere, etc.

Cross-Talk Sensitivity Reduction

In certain embodiments, cross-talk sensitivity in xy-axis rotational rate shell-type gyroscopes is reduced by using a single in-plane drive mode (which may be flexural or bulk) and two out-of-plane sensing modes (which may be flexural or bulk, and may be degenerate or non-degenerate) for sensing rotation about two in-plane axes, i.e., x-axis and y-axis. Unlike a shell-type xy-axis gyroscope driven with an out-of-plane mode, driving the gyroscope with an in-plane mode rejects the cross-coupling of unwanted in-plane velocity from the desired Coriolis force. More specifically, the shell-type gyroscope driven in the in-plane mode generates in-plane drive velocity, and this in-plane drive velocity is parallel to the plane of shell-type gyroscopes (i.e., it is along either the x-axis or y-axis). Thus, at any single point, the Coriolis forces will be created due to one and only one in-plane rotation rate, and the other in-plane rate will be rejected. As a result, the cross-talk sensitivity between the two in-plane modes will be automatically reduced without using any compensation method. The gyroscope additionally may be configured to sense rotation rate about the z-axis for three-axis sensitivity.

FIG. 1 is a schematic diagram of a shell-type gyroscope 100 in accordance with an exemplary embodiment. Here, a resonator 106 is anchored by top anchor 112 to top substrate 102 and by bottom anchor 114 to bottom substrate 104. Drive electrodes 108 aside the resonator 106 are used to drive the in-plane resonance mode (e.g., electrostatically), while sense electrodes 110 underlying the resonator 106 are used to sense the two out-of-plane degenerate or non-degenerate modes excited by Coriolis forces (rotation rates around the x and y in-plane axes). It should be noted that sense electrodes additionally or alternatively may be placed above the resonator 106. Similarly, while the resonator 106 is shown as being supported or anchored from the top and bottom, the resonator 106 alternatively may be supported from the top or bottom only.

Figure 2:
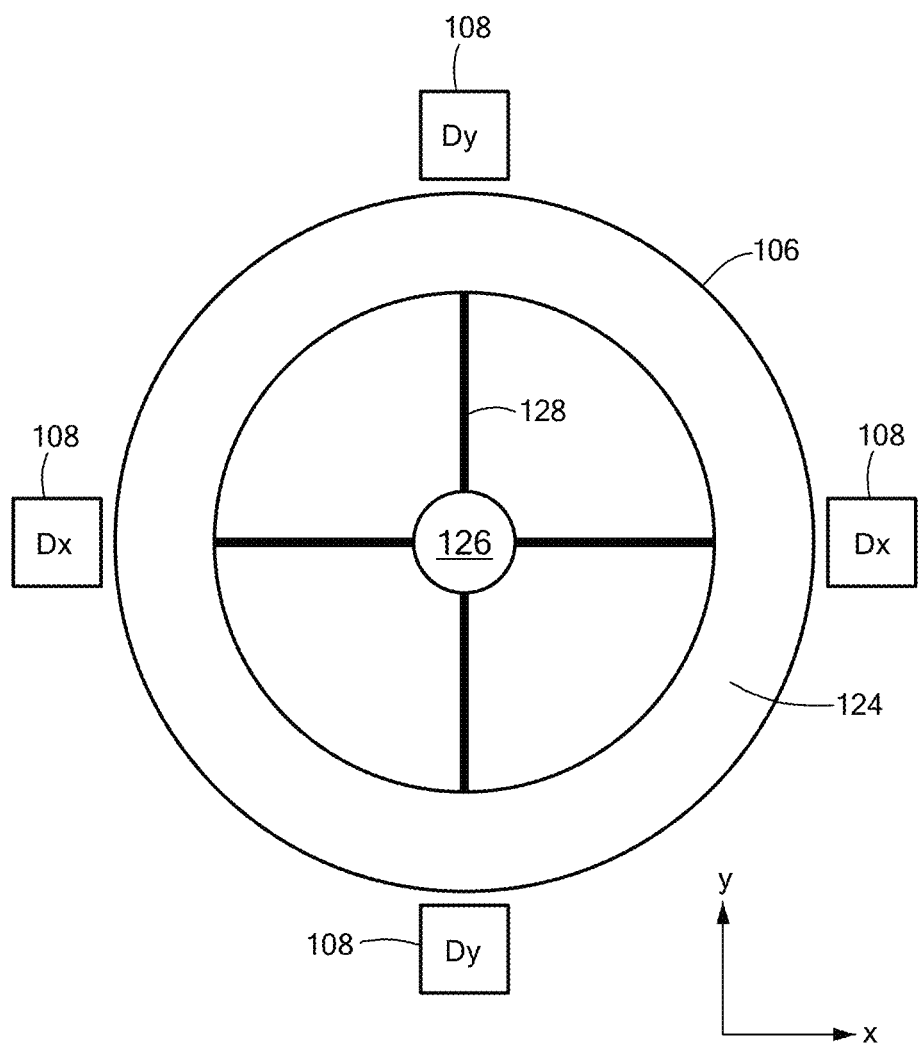
FIG. 2 schematically shows the configuration of the resonator and drive electrodes in one exemplary embodiment.

FIG. 2 shows the configuration of the resonator 106 and drive electrodes 108 in one exemplary embodiment. Here, the resonator 106 is shown as being configured in a "hub-and-spoke" configuration with an outer ring 124 coupled to an inner hub 126 via a number of spokes 128, although the resonator 106 may be other shapes/configurations in other embodiments (e.g., a solid or perforated disk or plate, donut, ring, etc.). The hub 126 is attached via anchors 112 to the substrates 102 and 104.

Figure 3:
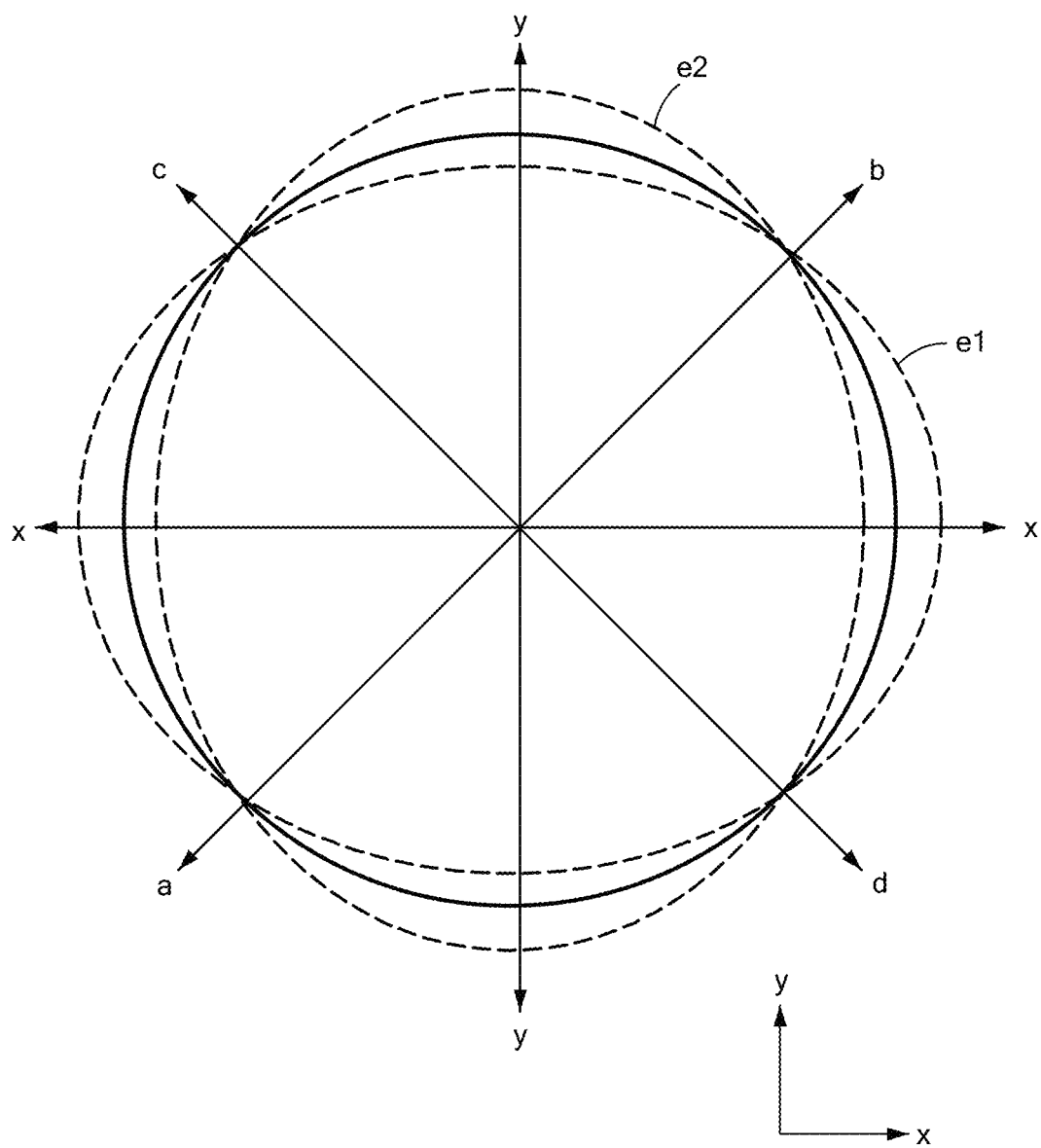
FIG. 3 schematically shows a flexural and/or bulk resonance mode in which the resonator alternates in elliptical mode shape.

In one exemplary embodiment of the resonator 106 shown in FIG. 2, the drive electrodes 108 drive the outer ring 124 in a flexural or bulk mode in the plane of the resonator 106, as depicted in FIG. 3. Here, a solid line indicates the geometry of the ring 124 in its inactive state (i.e., circular), a dashed ellipse designated "e1" corresponds to an extremal extension of the ring along the x-axis, and a dashed ellipse designated "e2" illustrates an extremal extension of the ring along the y-axis. In this resonance mode, the resonator essentially has anti-nodes along the x and y axes simultaneously, i.e., the resonator alternates between one mode shape in which the anti-node along the x-axis is at its maximum when the anti-node along the y-axis is at its minimum and a second mode shape in which the anti-node along the y-axis is at its maximum when the anti-node along the x-axis is at its minimum. The drive electrodes 108 aligned with the x-axis produce drive forces along the x-axis (hence, those drive electrodes are indicated as Dx), while the drive electrodes 108 aligned along the y-axis produce drive forces along the y-axis (hence, those drive electrodes are indicates as Dy). It should be noted that the points at which lines ab and cd (which are offset 45 degrees relative to the x and y axes) intersect the circle and the two ellipses represent nodes at which there is substantially no driven displacement of the resonator.

Figure 4:
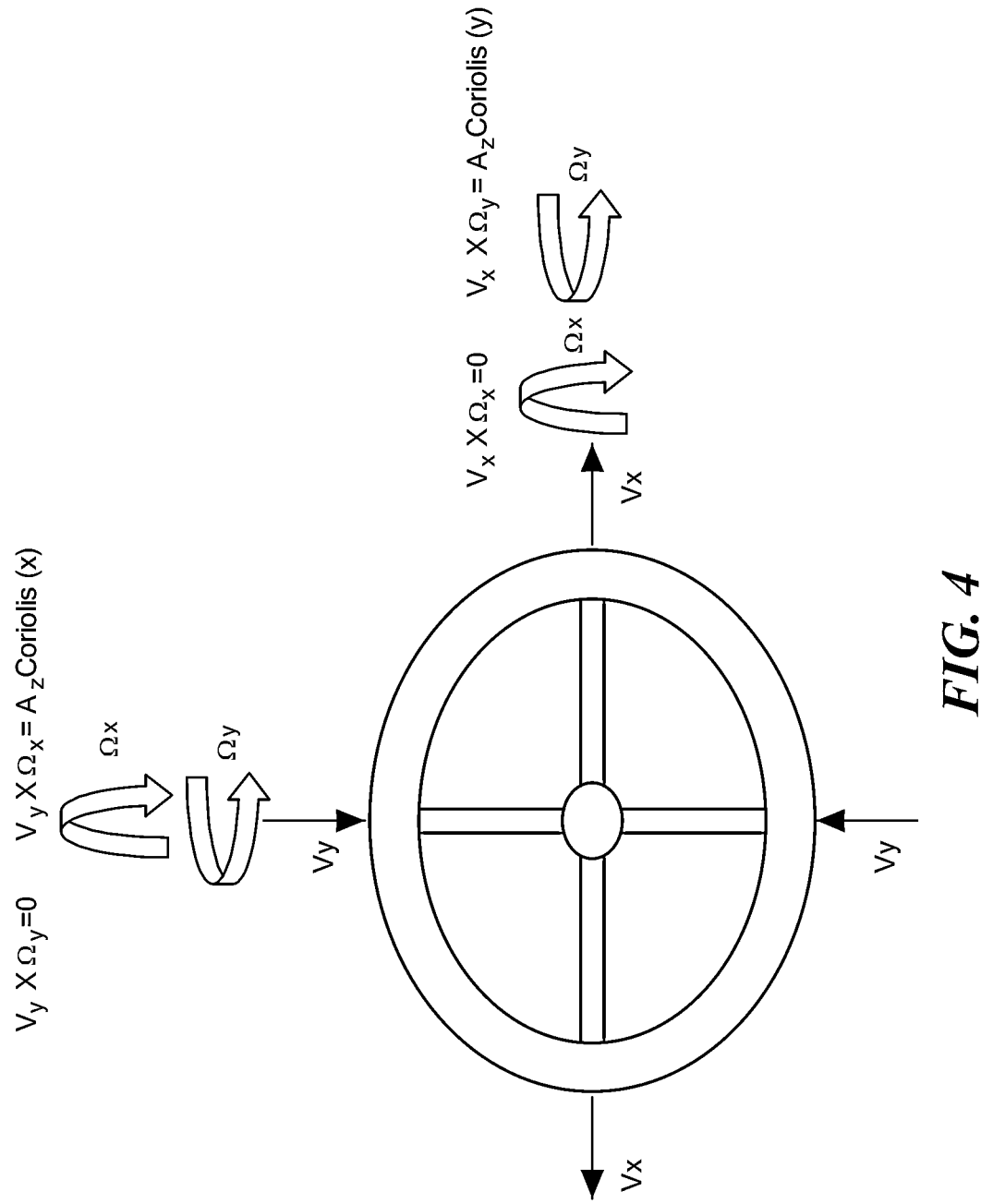
FIG. 4 is a schematic diagram showing representations of the in-plane elliptical drive mode and the Coriolis forces along each axis for the embodiment of FIGS. 1-3.

FIG. 4 is a schematic diagram showing representations of the in-plane elliptical drive mode and the Coriolis forces along each axis two out-of-plane sense modes (which may be degenerate or non-degenerate, bulk or flexural) for the embodiment of FIGS. 1-3. Here, Vx is the velocity of the resonator in-plane along the x-axis, Vy is the velocity of the resonator in-plane along the y-axis, $\Omega x$ is the rotation rate about the x-axis, and $\Omega y$ is the rotation rate about the y-axis. Here, the Coriolis acceleration along the z-direction at each axis is essentially the cross-product of the velocity along that axis and the rotation rate about the other axis. One out-of-plane sense mode has anti-node lines in the z-direction along the x-axis and detects only the $\Omega y$, i.e., rotation about the y-axis results in Coriolis acceleration in the z-direction along the x-axis (i.e., $Vx \times \Omega y = AzCoriolis(y)$), which can be sensed using out-of-plane sense electrodes aligned with the x-axis, but rotation about the x-axis produces no Coriolis acceleration in the z-direction along the x-axis (i.e., $Vx \times \Omega x = 0$). A second out-of-plane sense mode has anti-node lines in the z-direction along the y-axis and detects only the $\Omega x$, i.e., rotation about the x-axis results in Coriolis acceleration in the z-direction along the y-axis (i.e., $Vy \times \Omega x = AzCoriolis(x)$), which can be sensed using out-of-plane sense electrodes aligned with the y-axis, but rotation about the y-axis produces no Coriolis acceleration in the z-direction along the y-axis (i.e., $Vy \times \Omega y = 0$).

Figure 5:
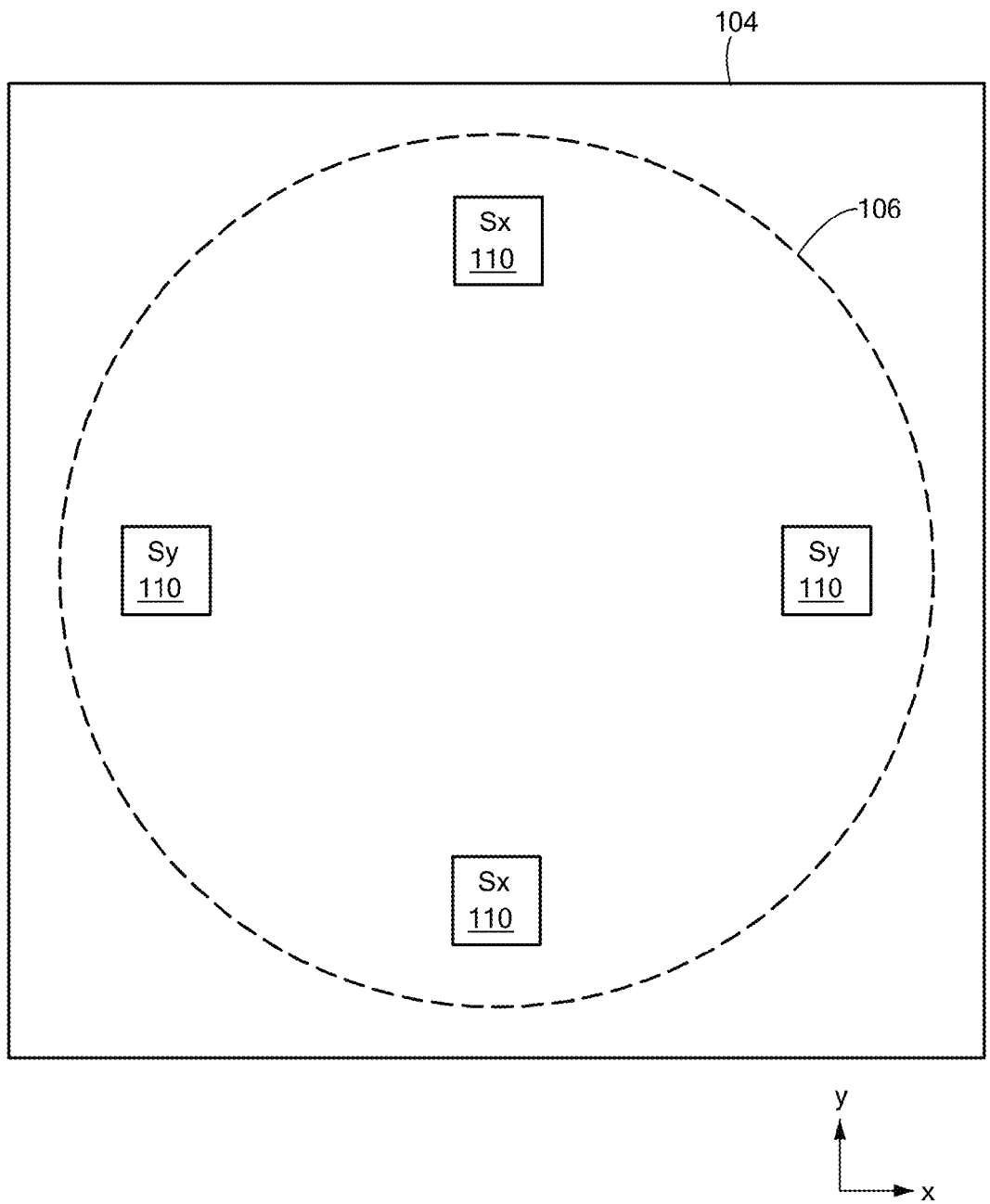
FIG. 5 is a schematic diagram showing relative placement of sense electrodes for sensing two out-of-plane sense modes in accordance with the embodiment shown in FIGS. 1-4.

FIG. 5 is a schematic diagram showing relative placement of sense electrodes 110 in accordance with the embodiment of FIGS. 1-4. Here, the sense electrodes are placed in line with the x and y axes on the bottom substrate 104 underlying portions of the resonator 106 (the outline of which is depicted with a dashed line). The in-plane resonance mode generates velocities in the plane of the resonator 106 along the x and y axes simultaneously (e.g., a round resonator driven in an elliptical flexural or bulk resonance mode alternately expands and contracts along the x and y axes, as depicted schematically in FIG. 3). As discussed above with reference to FIG. 4, the sense electrodes 110 aligned with the y-axis sense the out-of-plane mode (which can be flexural or bulk) caused by rotation of the device about the x-axis (hence, those sense electrodes are indicated as Sx), while the sense electrodes 110 aligned with the x-axis sense the out-of-plane mode (which can be flexural or bulk) caused by rotation of the device about the y-axis (hence, those sense electrodes are indicated as Sy).

Figure 6:
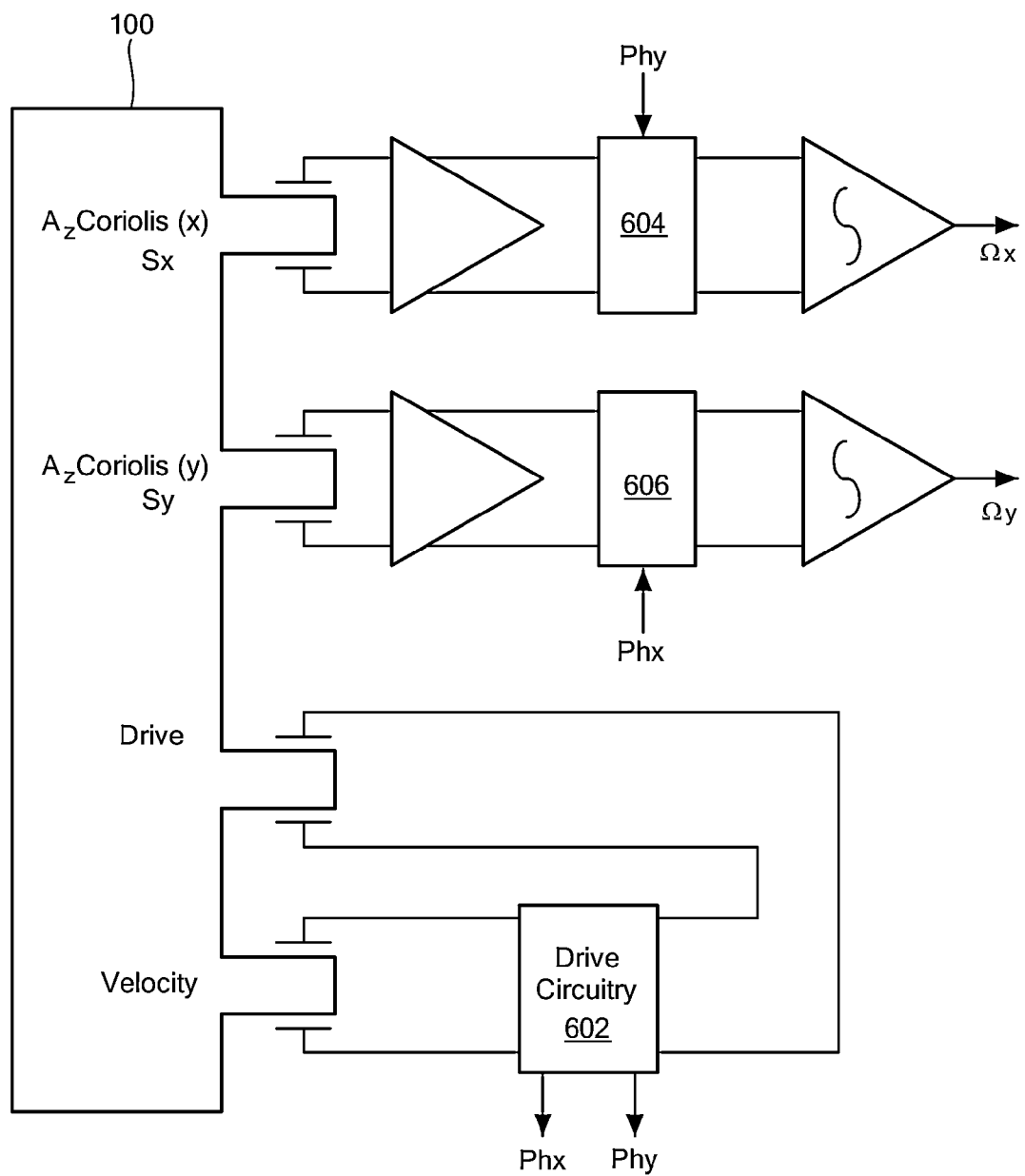
FIG. 6 is a schematic diagram showing the gyroscope of FIGS. 1-5 along with relevant circuitry blocks, in accordance with an exemplary embodiment.

FIG. 6 is a schematic diagram showing the gyroscope of FIGS. 1-5 along with relevant circuitry blocks, in accordance with an exemplary embodiment. Here, drive circuitry 602 produces the drive signal for the drive electrodes 108 based on velocity feedback signals received from the gyroscope 100. The drive circuitry also produces in-phase velocity reference signals Phx (corresponding to Vx) and Phy (corresponding to Vy). The output from the Sx sense electrodes 110 is amplified and processed with reference to the Phy reference signal in block 604 to produce an output signal representing the rotation rate about the x-axis (i.e., $\Omega x$), while the output from the Sy sense electrodes 110 is amplified and processed with reference to the Phx reference signal in block 606 to produce an output signal representing the rotation rate about the y-axis (i.e., $\Omega y$).

Figure 7:
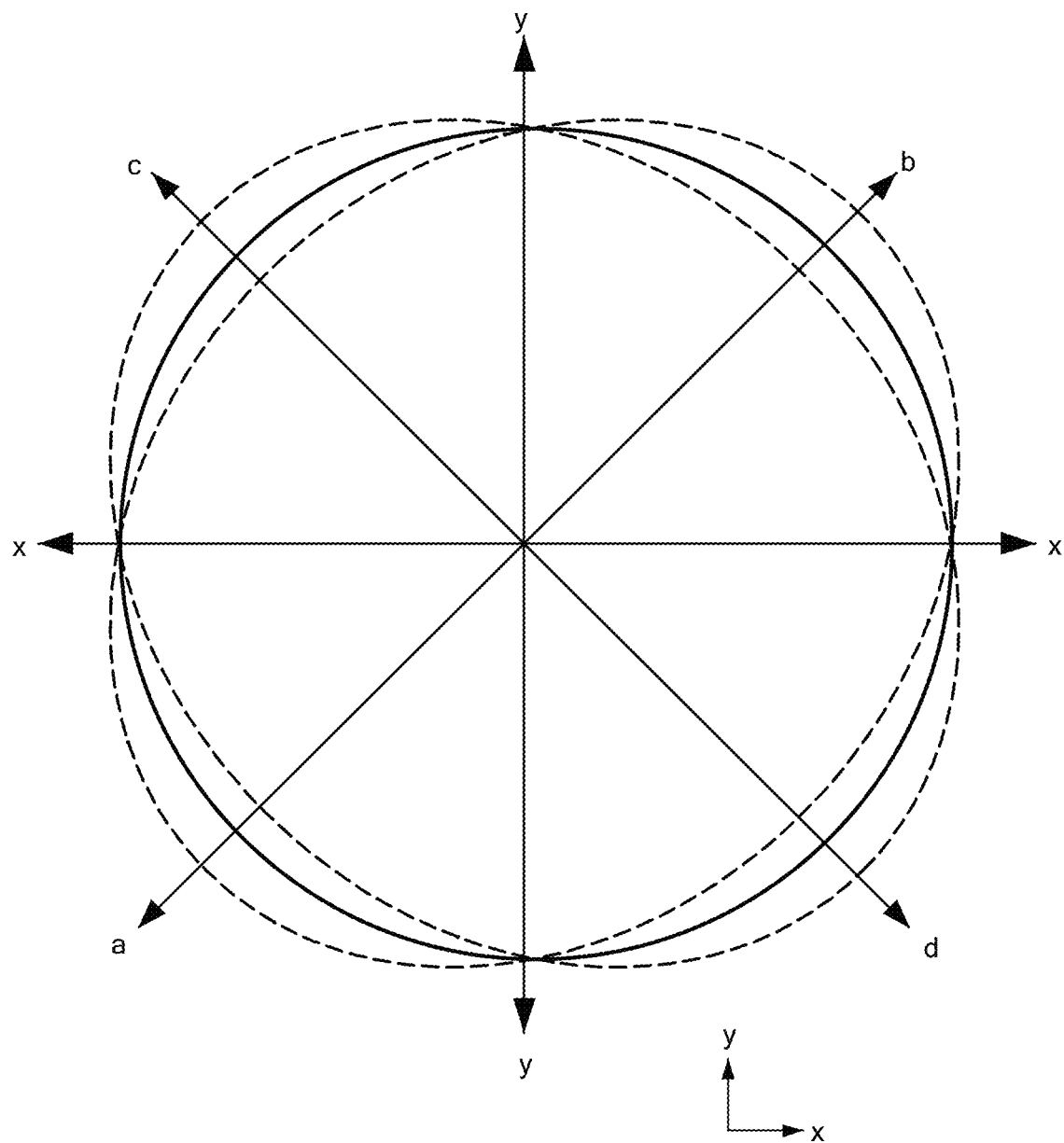
FIG. 7 schematically shows a change in the nominal oscillatory mode shapes shown in FIG. 3 caused by rotation about the z-axis such that the nodal points of the ellipses shift by 45 degrees.
Figure 8:
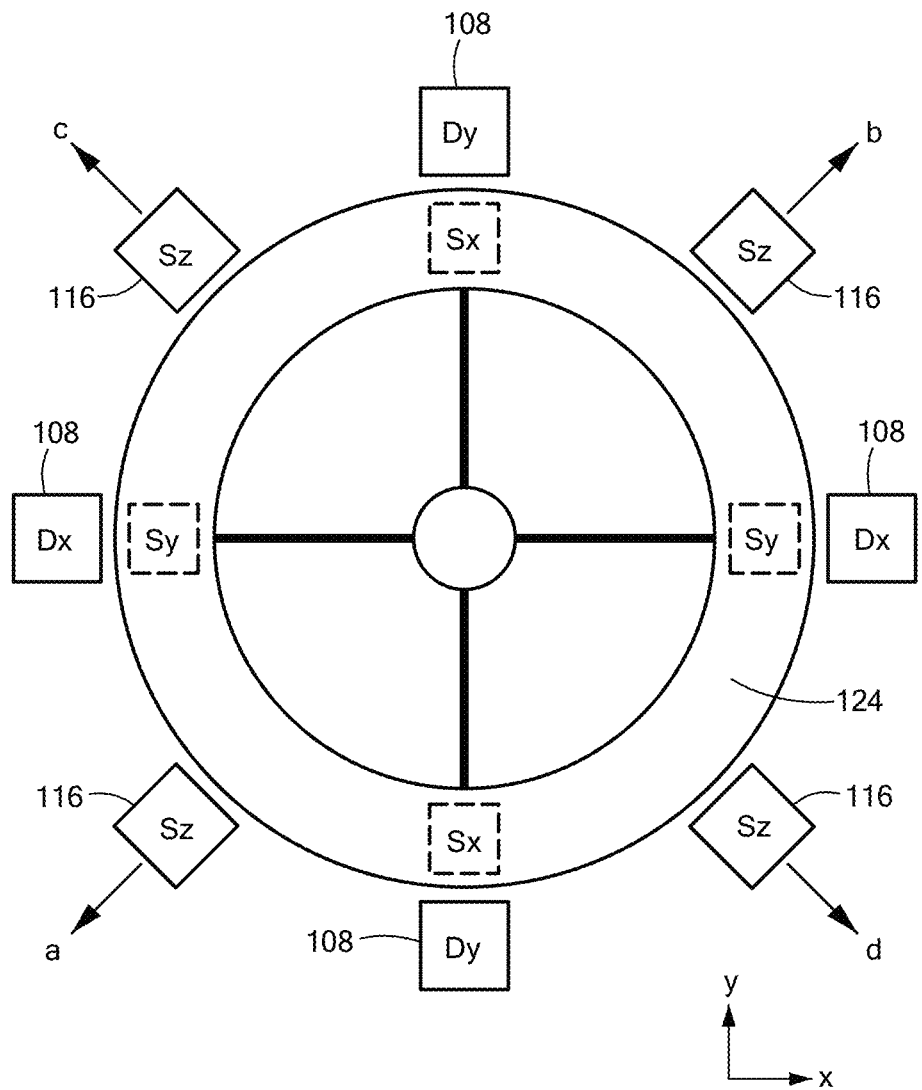
FIG. 8 is a schematic diagram showing relative placement of sense electrodes for sensing z-axis rotation rate in accordance with the embodiment shown in FIG. 6.

In addition to sensing rotation rates about the x and y axes in the plane of the resonator 106 based on the in-plane flexural or bulk drive mode, the device can be configured to further sense rotation rate about the z-axis. Specifically, rotation about the z-axis will cause a change in the nominal oscillatory mode shapes shown in FIG. 3 such that the nodal points of the ellipses shift by 45 degrees, i.e., along lines ab and cd, as depicted in FIG. 7. Thus, additional sense electrodes 116 may be included adjacent to and in the plane of the resonator 106 along the lines ab and cd, as depicted in FIG. 8 (for convenience, the locations of the sense electrodes Sx and Sy underlying the outer ring 124 along the y and x axes, respectively, are shown with dashed lines). Such z-axis rotation rate sensing is discussed conceptually in US Publication No. 2010/0058861 and in Johari, H., *Micromachined Capacitive Silicon Bulk Acoustic Wave Gyroscopes*, Doctoral Thesis, Georgia Institute of Technology, Dec. 2008, each of which is hereby incorporated herein by reference it its entirety.

The coupling between the drive and sense modes (i.e., the angular gain) is critical for the performance of shell-typed gyroscopes. The angular gain in shell-typed gyroscopes is defined by the ratio of Coriolis coupling coefficient to the effective mass, and it depends on the resonant modes in operation as well as the structure's shape and dimension. For typical z-axis shell-type gyroscopes, the angular gain can be calculated easily, since both the drive and sense modes are in-plane modes. The angular gain for xy-axis gyroscopes is more complex due to the coupling between the in-plane and out-of-plane modes.

Figure 9:
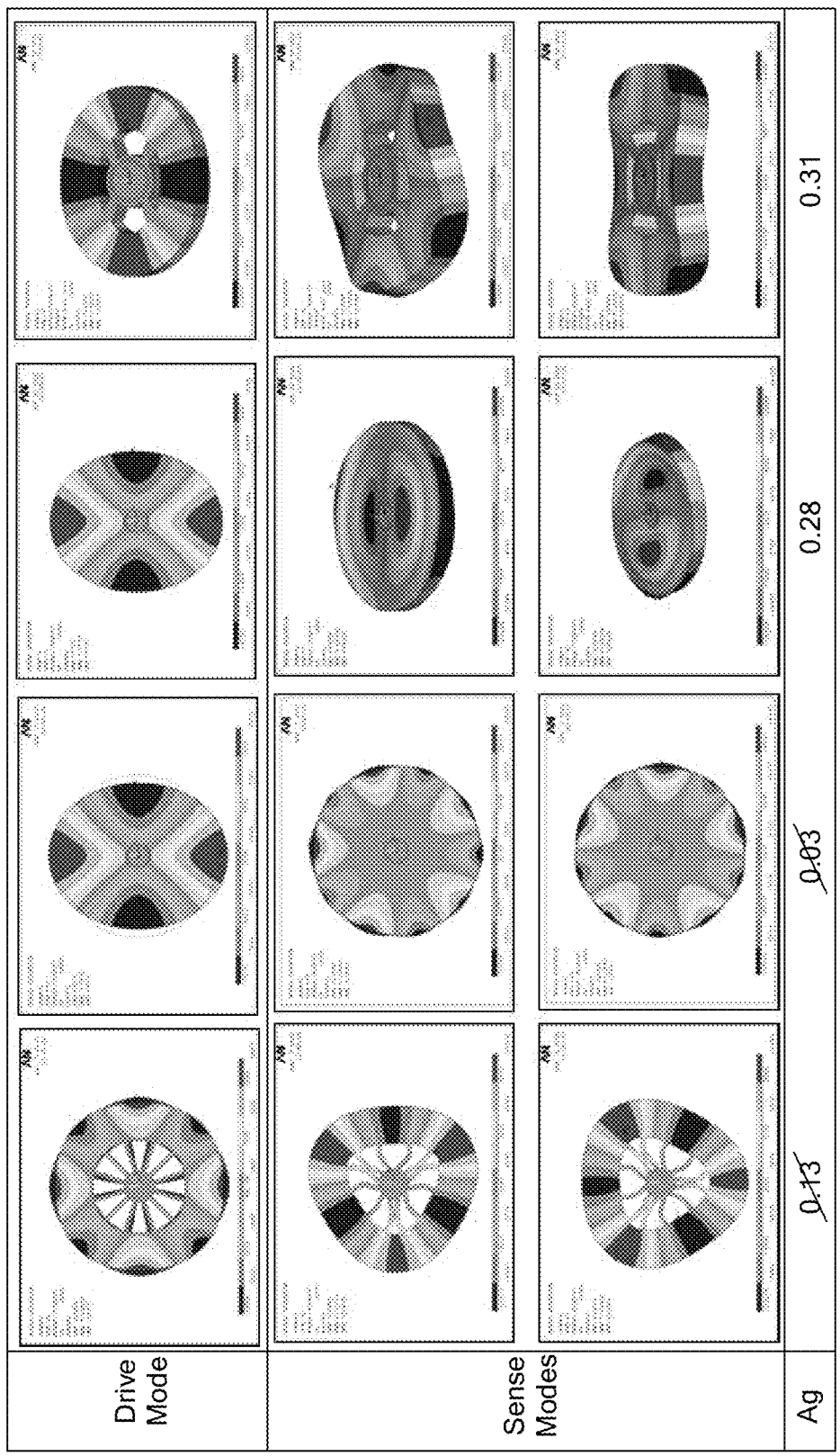
FIG. 9 shows estimated angular gains for various drive and sense modes.

FIG. 9 shows estimated angular gain for various drive and sense modes. The first column shows an estimated angular gain of 0.13 when the drive mode is a fourth-order out-of-plane drive mode and the sense modes are third-order in-plane elliptical (bulk or flexural) modes. The second column shows an estimated angular gain of 0.3 when the drive mode is a first-order in-plane elliptical (bulk or flexural) mode and the sense modes are fifth-order out-of-plane sense modes. The third column shows an estimated angular gain of 0.28 when the drive mode is a first-order in-plane elliptical (bulk or flexural) mode and the sense modes are third-order radial out-of-plane (3,1) modes. The fourth column shows an estimated angular gain of 0.31 when the drive mode is a first-order in-plane elliptical (bulk or flexural) mode and the sense modes are third-order tangential out-of-plane (1,3) modes.

Embodiments include appropriate drive and sense circuitry (not shown in the figures) for driving the resonator in the in-plane flexural or bulk mode and sensing rotation about the x and y axes using the out-of-plane modes (which can be degenerate or non-degenerate, flexural or bulk). The circuitry also may include circuitry for sensing rotation about the z-axis. Such circuitry may be integrated with the gyroscope or may be external to the gyroscope.

Mode-Matching

To achieve high signal to noise ratio in shell-type xy-axis gyroscopes, the stiffness of the in-plane modes should be matched (or closely matched) with the stiffness of out-of-plane modes. Generally speaking, for gyroscopes that operate with flexural modes both in-plane and out-of-plane for actuation and sensing, the resonator generally needs to be thin. However, a thin resonator tends to reduce the transduction area and electrostatic tuning forces used for actuation and sensing. Weak electrostatic forces are generally unable to compensate for thickness variations across the wafer, which impacts the matched mode operation. Thin structure also reduces inertial mass, which reduces sensitivity of gyro. As a result, such xy-axis gyroscopes often are limited to split-mode (i.e., unmatched modes) operation, which generally results in a lower SNR.

As discussed above, shell-type gyroscopes can be operated using different in-plane and out-of-plane modes, i.e., a flexural mode in one plane and a bulk mode in the other plane. For example, the gyroscope discussed above with reference to FIGS. 1-5 may be operated using an in-plane bulk drive mode and out-of-plane flexural sense modes.

Flexural modes (both in-plane flexural and out-of-plane flexural modes) typically have lower frequencies compared with bulk modes. The frequencies of bulk and flexural modes are dependent on such things as the thickness of the resonator or the size (e.g., radius) of the resonator. For example, the frequency of a flexural out-of-plane mode is linearly proportional to the device thickness, so the frequency of out-of-plane flexural modes will be increased for thick structures. On the other hand, the frequency of an in-plane bulk mode usually is high and is inversely proportional with the in-plane dimension (for example, radius in the circular structure or length/width in a bar or plate structure) and does not depend on the thickness of the proof mass.

Thus, in certain alternate embodiments of the present invention, the resonator shape and dimensions (both in-plane and out-of-plane) are configured to closely adjust the frequency of the in-plane and out-of-plane modes in order to operate in matched or near-matched mode. For example, due to the higher frequency of in-plane bulk modes compared with out-of-plane flexural modes, a thicker resonator may be used to increase the frequency of the out-of-plane flexural modes and allow for closely matched-mode operation. Among other things, a thick structure will increase the transduction area and electrostatic forces and inertial mass.

Miscellaneous

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Without limitation, potential subject matter that may be claimed (prefaced with the letter "P"so as to avoid confusion with the actual claims presented below) includes:

P1. A shell-type gyroscope with matched mode or near matched mode, the shell-type gyroscope comprising:
   a resonator substantially disposed in a resonator plane;
   a plurality of drive electrodes disposed substantially in the resonator plane; and
   a plurality of sense electrodes disposed in an electrode plane parallel to the resonator plane, wherein the resonator is driven via the drive electrodes in an in-plane bulk resonance mode substantially in the resonator plane, and wherein the rotations about two axes in the resonator plane are sensed via the sense electrodes using two out-of-plane flexural modes of the resonator caused by rotation about the axes.

P2. A shell-type gyroscope according to claim P1, wherein the two out-of-plane flexural modes are degenerate modes.

P3. A shell-type gyroscope according to claim P1, wherein the two out-of-plane flexural modes are non-degenerate modes.

P4. A shell-type gyroscope according to claim P1, wherein the in-plane bulk mode is an elliptical bulk mode, and wherein the out-of-plane flexural modes are third-order modes.

P5. A shell-type gyroscope according to claim P4, wherein the third-order modes are (1,3) modes.

P6. A shell-type gyroscope according to claim P4, wherein the third-order modes are (3,1) modes.

P7. A shell-type gyroscope according to claim P1, wherein the resonator is configured such that the frequencies of the out-of-plane flexural modes substantially match the frequency of the in-plane bulk mode.

P8. A shell-type gyroscope according to claim P1, further comprising:
   a second plurality of sense electrodes disposed substantially in the resonator plane, wherein rotations about an axis normal to the resonator plane are sensed via the second plurality of sense electrodes.

P9. A method for operating a shell-type gyroscope having a resonator substantially disposed in a resonator plane, a plurality of drive electrodes disposed substantially in the resonator plane, and a plurality of sense electrodes disposed in an electrode plane parallel to the resonator plane, the method comprising:
   driving, via the drive electrodes, resonance of the resonator in an in-plane bulk resonance mode substantially in the resonator plane; and sensing, via the sense electrodes, rotations about two axes in the resonator plane using two out-of-plane flexural modes of the resonator caused by rotation about the axes.

P10. A method according to claim P9, wherein the two out-of-plane flexural modes are degenerate modes.

P11. A method according to claim P9, wherein the two out-of-plane flexural modes are non-degenerate modes.

P12. A method according to claim P9, wherein the in-plane bulk mode is an elliptical bulk mode, and wherein the out-of-plane flexural modes are third-order modes.

P13. A method according to claim P12, wherein the third-order modes are (1,3) modes.

P14. A method according to claim P12, wherein the third-order modes are (3,1) modes.

P15. A method according to claim P9, wherein the resonator is configured such that the frequencies of the out-of-plane flexural modes substantially match the frequency of the in-plane bulk mode.

P16. A method according to claim P9, further comprising: sensing rotations about an axis normal to the resonator plane via a second plurality of sense electrodes disposed substantially in the resonator plane.

P17. A shell-type gyroscope comprising a resonator substantially disposed in a resonator plane, the resonator configured such that the frequency of an out-of-plane flexural mode substantially matches the frequency of an in-plane bulk mode.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A shell-type gyroscope with improved cross-talk sensitivity, the shell-type gyroscope comprising:
   a resonator substantially disposed in a resonator plane;
   a plurality of drive electrodes disposed substantially in the resonator plane; and
   a plurality of sense electrodes disposed in a plane apart from and parallel to the resonator plane, wherein the resonator is driven via the drive electrodes in an in-plane bulk resonance mode substantially in the resonator plane, and wherein rotations about two orthogonal sense axes in the resonator plane are sensed via the sense electrodes using two out-of-plane bulk modes of the resonator caused by rotation about the axes, the inplane mode substantially rejecting cross-talk between the two orthogonal sense axes.

2. A shell-type gyroscope according to claim 1, wherein the out-of-plane modes are degenerate modes.

3. A shell-type gyroscope according to claim 1, wherein the two out-of-plane modes are non-degenerate modes.

4. A shell-type gyroscope according to claim 1, wherein the two axes include orthogonal x and y axes, the drive and sense electrodes are aligned with the x and y axes, and the in-plane mode is an elliptical mode having anti-nodes substantially along the x and y axes, and wherein the sense electrodes that are parallel to the resonator plane and aligned with the x axis are configured for sensing rotation rate about the y axis and the sense electrodes that are parallel to the resonator plane and aligned with the y axis are configured for sensing rotation rate about the x axis.

5. A shell-type gyroscope according to claim 1, wherein the resonator is configured such that a frequency of the in-plane mode substantially matches a frequency of the out-of-plane mode.

6. A shell-type gyroscope according to claim 5, wherein at least one of the size, shape, or thickness of the resonator is specially configured to substantially match the frequencies.

7. A shell-type gyroscope according to claim 1, further comprising:
   a second plurality of sense electrodes disposed substantially in the resonator plane, wherein rotations about a z-axis normal to the resonator plane are sensed via the second plurality of sense electrodes.

8. A shell-type gyroscope according to claim 7, wherein the in-plane mode is a first elliptical mode having anti-nodes substantially along x and y axes, and wherein the second plurality of sense electrodes are located substantially at the anti-nodes of a second elliptical mode having anti-nodes along axes offset substantially 45 degrees from the x and y axes.

9. A method for operating a shell-type gyroscope having a resonator substantially disposed in a resonator plane, a plurality of drive electrodes disposed substantially in the resonator plane, and a plurality of sense electrodes disposed in a plane apart from and parallel to the resonator plane, the method comprising:
   driving, via the drive electrodes, resonance of the resonator in an in-plane bulk resonance mode substantially in the resonator plane; and
   sensing, via the sense electrodes, rotations about two orthogonal sense axes in the resonator plane using two out-of-plane bulk modes of the resonator caused by rotation about the axes, the in-plane mode substantially rejecting cross-talk between the two orthogonal sense axes.

10. A method according to claim 9, wherein the out-of-plane modes are degenerate modes.

11. A method according to claim 9, wherein the two out-of-plane modes are non-degenerate modes.

12. A method according to claim 9, wherein the two axes include orthogonal x and y axes, the drive and sense electrodes are aligned with the x and y axes, and the inplane mode is an elliptical mode having anti-nodes substantially along the x and y axes, and wherein the sense electrodes that are parallel to the resonator plane and aligned with the x axis are configured for sensing rotation rate about the y axis and the sense electrodes that are parallel to the resonator plane and aligned with the y axis are configured for sensing rotation rate about the x axis.

13. A method according to claim 9, further comprising:
   sensing rotations about a z-axis normal to the resonator plane via a second plurality of sense electrodes disposed substantially in the resonator plane.

14. A method according to claim 13, wherein the in-plane mode is a first elliptical mode having anti-nodes substantially along x and y axes, and wherein the second plurality of sense electrodes are located substantially at the anti-nodes of a second elliptical mode having anti-nodes along axes offset substantially 45 degrees from the x and y axes.

15. Apparatus for operating a shell-type gyroscope having a resonator substantially disposed in a resonator plane, a plurality of drive electrodes disposed substantially in the resonator plane, and a plurality of sense electrodes disposed in a plane apart from and parallel to the resonator plane, the apparatus comprising:

a drive circuit configured to drive, via the drive electrodes, resonance of the resonator in an in-plane bulk resonance mode substantially in the resonator plane; and a sense circuit configured to sense, via the sense electrodes, rotations about two orthogonal sense axes in the resonator plane using two out-of-plane bulk modes of the resonator caused by rotation about the axes, the in-plane mode substantially rejecting cross-talk between the two orthogonal sense axes.

16. Apparatus according to claim 15, wherein the out-of-plane modes are degenerate modes.

17. Apparatus according to claim 15, wherein the two out-of-plane modes are non-degenerate modes.

18. Apparatus according to claim 15, wherein the two axes include orthogonal x and y axes, the drive and sense electrodes are aligned with the x and y axes, and the in-plane mode is an elliptical mode having anti-nodes substantially along the x and y axes, and wherein the sense circuit is configured to sense rotation rate about the y axis using the sense electrodes aligned with the x axis and to sense rotation rate about the x axis using the sense electrodes aligned with the y axis.

19. Apparatus according to claim 18, where in the sense circuit includes:
 a first circuit configured to receive signals from the sense electrodes aligned with the y-axis indicative of a first resonant sense mode in a z-direction caused by rotation rate about the x-axis and output a signal indicative of rotation rate about the x-axis based on the signals from the sense electrodes in the z-direction and aligned with the y-axis and a velocity signal indicative of velocity of the resonator along the y-axis; and a second circuit configured to receive signals from the sense electrodes aligned with the x-axis indicative of a second resonant sense mode in the z-direction caused by rotation rate about the y-axis and output a signal indicative of rotation rate about the y-axis based on the signals from the sense electrodes in the z-direction and aligned with the x-axis and a velocity signal indicative of velocity of the resonator along the x-axis.

20. Apparatus according to claim 15, wherein the gyroscope further comprises a second plurality of sense electrodes disposed substantially in the resonator plane, and wherein the sense circuit is configured to receive signals from the second plurality of sense electrodes indicative of a resonant sense mode in the resonator plane caused by rotation rate about a z-axis normal to the resonator plane and output a signal indicative of rotation rate about the z-axis based on the signals from the second plurality of sense electrodes.

21. Apparatus according to claim 20, wherein the in-plane mode is a first elliptical mode having anti-nodes substantially along x and y axes, and wherein the second plurality of sense electrodes are located substantially at the anti-nodes of a second elliptical mode having anti-nodes along axes offset substantially 45 degrees from the x and y axes.

22. A method for reducing cross-talk sensitivity in an xy-axis shell-type gyroscope having a resonator substantially disposed in a resonator plane, the method comprising:
 operating the gyroscope with a single in-plane bulk resonance mode; and
 sensing two out-of-plane degenerate or non-degenerate bulk resonance modes resulting respectively from rotations about two sense axes in the resonator plane.

* * * * *

UNITED STATES PATENT AND TRADEMARK OFFICE
CERTIFICATE OF CORRECTION

PATENT NO. : 9,091,544 B2  
APPLICATION NO. : 13/482186  
DATED : July 28, 2015  
INVENTOR(S) : Houri Johari-Galle Page 1 of 1

It is certified that error appears in the above-identified patent and that said Letters Patent is hereby corrected as shown below:

In the Claims

In Col. 9, line 51  
replace "inplane"  
with --in-plane--

Signed and Sealed this  
Twenty-first Day of June, 2016

Michelle K. Lee  
*Director of the United States Patent and Trademark Office*